United States Patent
Tsai et al.

(10) Patent No.: US 10,108,873 B2
(45) Date of Patent: Oct. 23, 2018

(54) CLOUD-BASED TRANSREGIONAL LICENSE-PLATE-RECOGNITION SYSTEM AND METHOD THEREOF

(71) Applicant: Chicony Power Technology Co., Ltd., New Taipei (TW)

(72) Inventors: Jewel Tsai, New Taipei (TW); Kuo-Wei Lee, New Taipei (TW); Li-Yuan Lu, New Taipei (TW); Ming Chen, New Taipei (TW)

(73) Assignee: CHICONY POWER TECHNOLOGY CO., LTD., New Taipei (TW)

( * ) Notice: Subject to any disclaimer, the term of this patent is extended or adjusted under 35 U.S.C. 154(b) by 1 day.

(21) Appl. No.: 15/632,548

(22) Filed: Jun. 26, 2017

(65) Prior Publication Data
US 2018/0253617 A1    Sep. 6, 2018

(30) Foreign Application Priority Data
Mar. 3, 2017   (TW) .............................. 106107081 A (51) Int. Cl.
*G06K 9/00*    (2006.01)
*G06K 9/32*    (2006.01)
(Continued)

(52) U.S. Cl.
CPC ..... *G06K 9/3258* (2013.01); *G06F 17/30241* (2013.01); *G06K 9/209* (2013.01); *G08G 1/0175* (2013.01); *G06K 2209/15* (2013.01)

(58) Field of Classification Search
USPC ....... 382/100, 103–107, 155, 162, 168, 173, 382/181, 199, 206, 209, 219, 224, 232,
(Continued)

(56) References Cited

U.S. PATENT DOCUMENTS

| 9,594,971 B1* | 3/2017 | Wilbert .................. G06K 9/325 |
| 2015/0138001 A1* | 5/2015 | Davies ................... G08G 1/149 340/932.2 |

(Continued)

FOREIGN PATENT DOCUMENTS

| JP | 2004525447 A | 8/2004 |
| JP | 2006252139 A | 9/2006 |

(Continued)

OTHER PUBLICATIONS

Office Action dated Jul. 17, 2018 of the corresponding Japan patent application No. 2017-094045.

*Primary Examiner* — Seyed Azarian
(74) *Attorney, Agent, or Firm* — Chun-Ming Shih; HDLS IPR Services (57) ABSTRACT

A cloud-based transregional license-plate-recognition system and a method thereof are disclosed. The system includes a local license-plate-capture module and a cloud license-plate-recognition module. The local license-plate-capture module captures a license plate image when detecting that a vehicle is approaching, obtains position information, modulates the license plate image and the position information into recognition information and sends the recognition information to the cloud license-plate-recognition module. The cloud license-plate-recognition module retrieves and demodulates the recognition information to retrieve a recognition image and index information, selects at least one of a plurality of recognition logics according to the index information, and executes a license-plate-recognizing process on the recognition image by the selected recognition logic for generating license plate information. The disclosed system eliminates operations relating to geographic region and increases the recognition success rate and recognition (Continued)

speed and decreases the equipment hardware cost of local end.

16 Claims, 6 Drawing Sheets

(51) Int. Cl.
*G08G 1/017* (2006.01)
*G06F 17/30* (2006.01)
*G06K 9/20* (2006.01)
*G08G 1/01* (2006.01)

(58) Field of Classification Search
USPC ....... 382/254, 274, 276, 286–291, 305, 312, 382/321; 340/932.2, 933
See application file for complete search history.

(56) References Cited

U.S. PATENT DOCUMENTS

| | | | |
|---|---|---|---|
| 2015/0161464 A1* | 6/2015 | Hansen | G06K 9/00791 382/105 |
| 2016/0342156 A1* | 11/2016 | Jackson | G08G 1/0175 |
| 2016/0357187 A1* | 12/2016 | Ansari | G01S 15/931 |
| 2017/0107752 A1* | 4/2017 | Dvir | H04L 67/10 |

FOREIGN PATENT DOCUMENTS

| | | | |
|---|---|---|---|
| JP | 2010086201 A | 4/2010 |
| JP | 2012164051 A | 8/2012 |

\* cited by examiner

CLOUD-BASED TRANSREGIONAL LICENSE-PLATE-RECOGNITION SYSTEM AND METHOD THEREOF

BACKGROUND OF THE INVENTION

Field of the Invention

The present disclosed example relates to a license-plate-recognition, and in particular relates to a cloud-based transregional license-plate-recognition system and a cloud-based transregional license-plate-recognition method.

Description of Prior Art

The license-plate-recognition system of the related art has ability of recognizing license plate images of vehicles of a designated geographic region for obtaining license plate character sets via using a designated recognition logic corresponding to the designated geographic region. However, each recognition logic is applicable only to recognize license plates of a single designated geographic region because license plate formats (such as license plate styles, languages or number arrays) of different geographic regions (for example different countries or administrative regions) are different. The license-plate-recognition system of the related art is not capable of recognizing license plates from every geographic region without proper set of recognition logic.

Furthermore, a user must manually select the changed geographic region after an arranged position of the license-plate-recognition system of the related art is changed. Accordingly, the license-plate-recognition system of the related art loads a recognition logic corresponding to the selected geographic region and uses the loaded recognition logic to execute license plate recognition so as to assure that the license-plate-recognition system of the related art is applicable to the changed position.

As a result, a user must manually select the recognition logic corresponding to the current geographic region after the arranged position of the license-plate-recognition system of the related art is changed in order to correctly execute the license plate recognition, and this manual setting increases the complexity of configuration.

Also, the license-plate-recognition system of the relate art uses a local device (such as a camera) to execute the license plate recognition on the license plate image, which increases the computing resource demand of the local device and increases the hardware cost of the local device.

SUMMARY OF THE INVENTION

The objective of the present disclosed example is to provide a cloud-based transregional license-plate-recognition system and a cloud-based transregional license-plate-recognition method. The system automatically selects applicable recognition logic according to the current position of a vehicle to perform cloud-based license plate recognition.

One of the exemplary embodiments, a cloud-based transregional license-plate-recognition system, comprises a local license-plate-capture module and a cloud license-plate-recognition module. The local license-plate-capture module comprises a vehicle sensor for detecting whether a vehicle is approaching, an image capture module electrically connected to the vehicle sensor for capturing a license plate image when the vehicle is approaching, a global positioning module for obtaining position information, a local control module electrically connected to the image capture module and the global positioning module for modulating the license plate image and the position information into recognition information, and a local transmission module electrically connected to the local control module for sending the recognition information externally via Internet. The cloud license-plate-recognition module is used to receive the recognition information from Internet, demodulate the recognition information to generate a recognition image and an index information, select at least one of a plurality of recognition logics based on the index information, and execute a license-plate-recognizing process on the recognition image via using the selected recognition logic to generate a license plate information.

One of the exemplary embodiments, a cloud-based transregional license-plate-recognition method, for a cloud-based transregional license-plate-recognition system, the cloud-based transregional license-plate-recognition system includes a local license-plate-capture module and a cloud license-plate-recognition module, the cloud-based transregional license-plate-recognition method comprises following steps of: a) capturing a license plate image when the local license-plate-capture module detects that a vehicle is approaching; b) obtaining position information; c) modulating the license plate image and the position information into recognition information and sending the recognition information to the cloud license-plate-recognition module; d) demodulating the recognition information by the cloud license-plate-recognition module to generate a recognition image and index information; and, e) selecting at least one of a plurality of recognition logics based on the index information, and executing a license-plate-recognizing process on the recognition image via using the selected recognition logic to generate license plate information.

The present disclosed example can effectively eliminate operations relating to geographic region and increases the recognition success rate and recognition speed and decreases the equipment hardware cost of local end.

BRIEF DESCRIPTION OF DRAWING

The features of the present disclosed example believed to be novel are set forth with particularity in the appended claims. The present disclosed example itself, however, may be best understood by reference to the following detailed description of the present disclosed example, which describes an exemplary embodiment of the present disclosed example, taken in conjunction with the accompanying drawings, in which:

DETAILED DESCRIPTION OF THE INVENTION

In cooperation with attached drawings, the technical contents and detailed description of the present disclosed example are described thereinafter according to a preferable embodiment, being not used to limit its executing scope. Any equivalent variation and modification made according to appended claims is all covered by the claims claimed by the present disclosed example.

Figure 1:
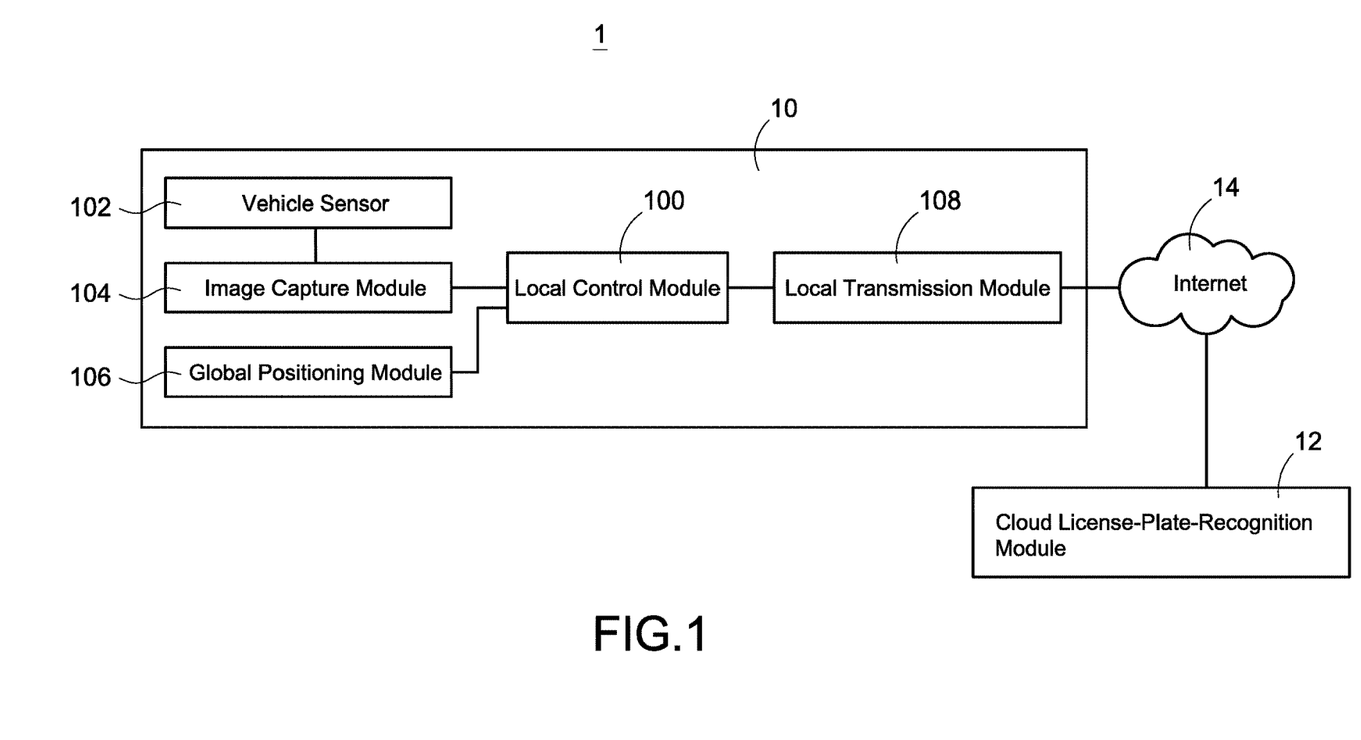
FIG. 1 is an architecture diagram of a cloud-based transregional license-plate-recognition system of an embodiment according to the present disclosed example.

FIG. 1 is an architecture diagram of a cloud-based transregional license-plate-recognition system of an embodiment according to the present disclosed example. As shown in the figure, a cloud-based transregional license-plate-recognition system 1 is disclosed, which may automatically select applicable recognition logic according to the current position of a vehicle to perform license-plate-recognizing process.

Specifically, the cloud-based transregional license-plate-recognition system 1 comprises a local license-plate-capture module 10 and a cloud license-plate-recognition module 12. The local license-plate-capture module 10 is connected to and communicates with the cloud license-plate-recognition module 12 via Internet.

The local license-plate-capture module 10 comprises a vehicle sensor 102, an image capture module 104 electrically connected to the vehicle sensor 102, a global positioning module 106, a local transmission module 108, and a local control module 100 electrically connected to the image capture module 104, the global positioning module 106 and local transmission module 108.

The vehicle sensor 102 is used for detecting whether the vehicle is approaching. Specifically, the vehicle sensor 102 generates and sends a set of sense signals to the image capture module 104 for triggering the image capture module 104 upon detecting that any vehicle approaches.

The vehicle sensor 102 may be an ultrasonic sensor, a weight sensor, an infrared sensor (for example as PIR sensor) or a vehicle sensor of other type. For example, when the vehicle sensor 102 is the ultrasonic sensor, the vehicle sensor 102 continuously sends ultrasonic waves via a sound wave transmitter and receives the returned waves (or transmitted waves) via a sound wave receiver and determines whether any vehicle is detected (such as determining that a vehicle is detected when the energy intensity is higher than a threshold) according to the energy intensity of the returned waves (or transmitted waves).

In another example, when the vehicle sensor 102 is the weight sensor with one or multiple sets of pressure sense modules (such as pressure resistance), each pressure sense module is embedded in the road and generates a set of pressure signals when a vehicle driving through. The vehicle sensor 102 determines whether any vehicle is detected according to the generated pressure signals (such as determining that a vehicle is detected and generates sense signals when the pressure signal intensity is higher than a weight threshold, or the set quantity of pressure signals is higher than a quantity threshold).

In another example, when the vehicle sensor 102 is the infrared sensor, the vehicle sensor 102 transmits infrared waves (such as laser beams) via a transmitter and receives reflected infrared waves via a receiver and determines whether any vehicle is detected according to the energy intensity of the reflected infrared waves (such as determining that a vehicle is detected and generates sense signals when the energy intensity is higher than a threshold).

The image capture module 104 is used for capturing visible light images. Specifically, the image capture module 104 is configured to capture the license plate image of the detected vehicle when receiving the sense signals sent by the vehicle sensor 102, and transfers the captured license plate image to the local control module 100.

The global positioning module 106 (such as a GPS locater, a Beidou Navigation Satellite System (BDS) locater or a Galileo locater) receives multiple satellite signals and computes to obtain a set of absolute position information according to the multiple satellite signals received from several satellites.

The local transmission module 108 (such as LTE network module, Ethernet network module, or Wi-Fi network module) is used for connecting the local transmission module 108 to the Internet 14, and further connected to the cloud license-plate-recognition module 12 via the Internet 14.

The local control module 100 (such as microcontroller (MCU) or processor) is used for controlling local license-plate-capture module 10. Specifically, the local control module 100 executes a modulating process to the license plate image captured by the image capture module 104 and the position information obtained by the global positioning module 106 for generating a set of recognition information, and sends the recognition information to cloud license-plate-recognition module 12 via the local transmission module 108.

In an embodiment, the local control module 100 obtains a set of position information via the global positioning module 106 and saves the set of obtained position information upon each start up, and generates recognition information according to the same saved position information and the latest captured license plate image. Thus, the local license-plate-capture module 10 only needs to launch the global positioning module 106 shortly in order to obtain the position information upon start up and do not need to continuously keep the global positioning module 106 on, which lowers the power consumption.

In an embodiment, the local control module 100 controls the global positioning module 106 to obtain the position information when the image capture module 104 is controlled to capture the license plate image. Thus, given the local license-plate-capture module 10 moves continuously (across the different geographic regions), the obtained position information matches with the real position upon the license plate image is captured which avoids the license-plate-recognizing process failure caused by that the obtained position information do not match with the real position.

The cloud license-plate-recognition module 12 is used for offering cloud license-plate-recognition service. Specifically, multiple recognition logics corresponding to multiple geographic regions are saved in advance in the cloud license-plate-recognition module 12, wherein each recognition logic comprises multiple recognition rules. The recognition rules are configured to recognize license plate images of the corresponded geographic regions. Above-mentioned recognition rules are used for indicating the local license plate rules, character block arrays or license plate color arrays of the license plate formats in the corresponding geographic regions or indicating the different character sets, the character sequences or the quantities of characters of the license plate formats in the corresponding geographic regions.

The cloud license-plate-recognition module 12 may execute a demodulating process on the recognition information to generate recognition image and index information after receiving the recognition information via Internet 14. Above-mentioned index information indicates the located geographic region where the local license-plate-capture module 10 captures above-mentioned license plate image. In an embodiment, the recognition image equals to above-mentioned license plate image, the index information equals to above-mentioned position information.

Next, the cloud license-plate-recognition module 12 determines the located geographic region of the local license-plate-capture module 10 based on the index information and automatically selects at least one of the multiple recognition logics according to the determined geographic region.

Lastly, the cloud license-plate-recognition module 12 loads the selected recognition logic, and executes a license-plate-recognizing process on the recognition image by the loaded recognition logic to generate license plate information. In an embodiment, each geographic region only corresponds to a single recognition logic (i.e., only one kind of license plate format is used in above-mentioned geographic region.) In another embodiment, each geographic region corresponds to a plurality of recognition logics (i.e., multiple kinds of license plate formats are used in above-mentioned geographic region) and the scope of the disclosed example is not limited thereto.

The present disclosed example can effectively omit the configuration operations of geographic regions and increase the success rate and recognition speed via dynamically selecting corresponded recognition logic to execute license-plate-recognizing process according to the real located position of the vehicle. In addition, the present disclosed example can lower the required computing resources of local devices and further lower the hardware cost of the local devices.

In an embodiment, the license plate information comprises license plate character sets. The cloud license-plate-recognition module 12 executes Optical Character Recognition (OCR) process on the recognition image to obtain multiple characters (i.e. a license plate character set) according to the selected recognition logic (the recognition logic refers to the multiple recognition rules of characters in specific languages such as Chinese, English, Japanese, or French), and categorizes the recognized multiple characters according to the selected recognition logic (i.e. categorizes the multiple characters into categories such as place of issue, license plate or customized content etc.).

In an embodiment, the cloud-based transregional license-plate-recognition system comprises multiple local license-plate-capture modules 10 respectively arranged at different geographic regions, wherein at least one of local license-plate-capture module 10 is arranged at a different region from the region that the cloud license-plate-recognition module 12 is located. Thus, the system of the present disclosed example only needs to arrange a single cloud license-plate-recognition module 12 to provide simultaneous cloud license-plate-recognition service to multiple local license-plate-capture modules 10 in different geographic regions, which effectively saves the set up cost.

It should be noted that the local license-plate-capture module 10 executes modulating process on the license plate image and the position information to generate recognition information, and the cloud license-plate-recognition module 12 executes demodulating process on the recognition information to generate the recognition image and the index information. Above-mentioned modulating process and demodulating process refer to data process instead of carrier wave signal process.

In an embodiment, above-mentioned modulating process is data type transforming process, data content analyzing process, data compressing process, data encoding process or other data process. In an embodiment, above-mentioned modulating process is data type transforming process, data content analyzing process, data decompressing process, data decoding process or other data process.

In an embodiment, above-mentioned modulating process is reversible data process or lossless data process. Specifically, the license plate image before modulating process corresponds to the recognition image after demodulating process (for example, both are completely identical or the display content is substantially identical), and the position information before modulating process corresponds to the index information after demodulating process (for example both are completely identical or the indicated content is substantially identical). For example, the modulating process is a packet encapsulating process, a compressing process or a lossless encoding process and is used for generating the recognition information which facilitates the data transfer (with less data size or compatible with network transmission protocols); and the demodulating process is a packet decapsulating process, a decompressing process or a lossless decoding process, which is used for restoring the recognition information into the recognition image to recognize and the index information to analyze. Thus, the present disclosed example effectively increases the transfer rate and assures that the cloud license-plate-recognition module receives lossless information.

In an embodiment, above-mentioned modulating process is irreversible data process and distortive data process. Specifically, the license plate image before modulating process is substantially different from the recognition image after demodulating process, and the position information before modulating process is substantially different from the index information after demodulating process.

For example, the modulating process or the demodulating process perform image processes such as cutting process, halftoning process, brightness/hue adjusting process, distortive compressing/decompressing process etc. on the Region of Interest (ROI) of a license plate image in order to generate a recognition image which facilitates a license-plate-recognizing process. Also, the modulating process or the demodulating process perform data processes such as data analyzing process (such as analyzing latitude and longitude coordinates of corresponding geographic regions), transforming process (such as transforming latitude and longitude coordinates into corresponding national codes, geographic regional codes, country names or geographic region names), and distortive-compressing/decompressing process on the position information in order to generate index information which facilitates analyzing corresponding geographic regions. As a result, the present disclosed example effectively increases the recognition success rate and recognition speed.

It should be noted that when there are more recognition logics used in a license plate recognition method, the required recognition time is longer. Compared with simultaneous using a great amount of recognition logics for all geographic regions (such as all countries) to execute a license-plate-recognizing process, the present disclosed example dynamically selects corresponded recognition logic to execute a license-plate-recognizing process according to the real position where the local license-plate-capture module 10 is located, which effectively reduces the recognition time and further increases the recognition speed.

Figure 2:
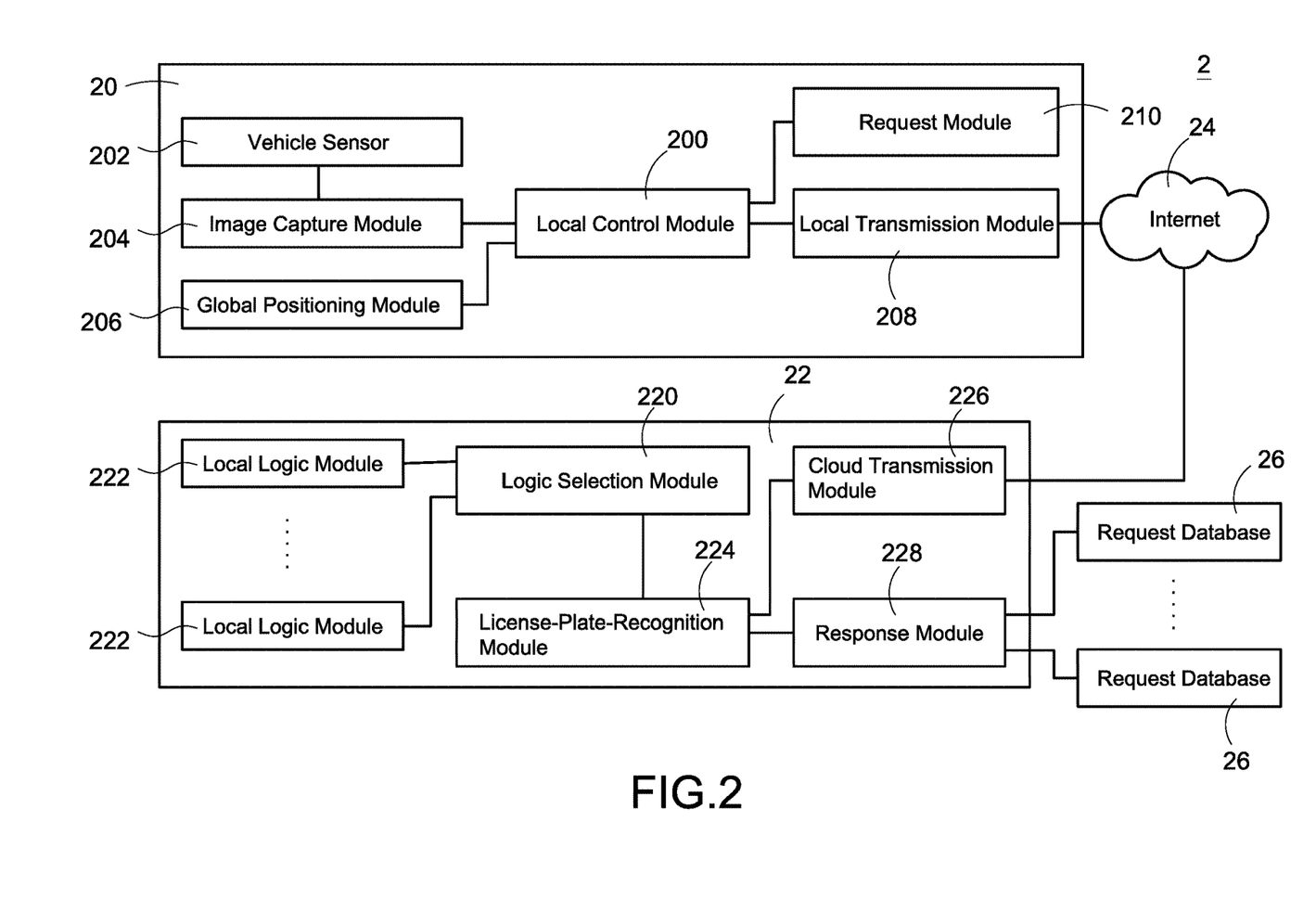
FIG. 2 is an architecture diagram of a cloud-based transregional license-plate-recognition system of another embodiment according to the present disclosed example.
Figure 3:
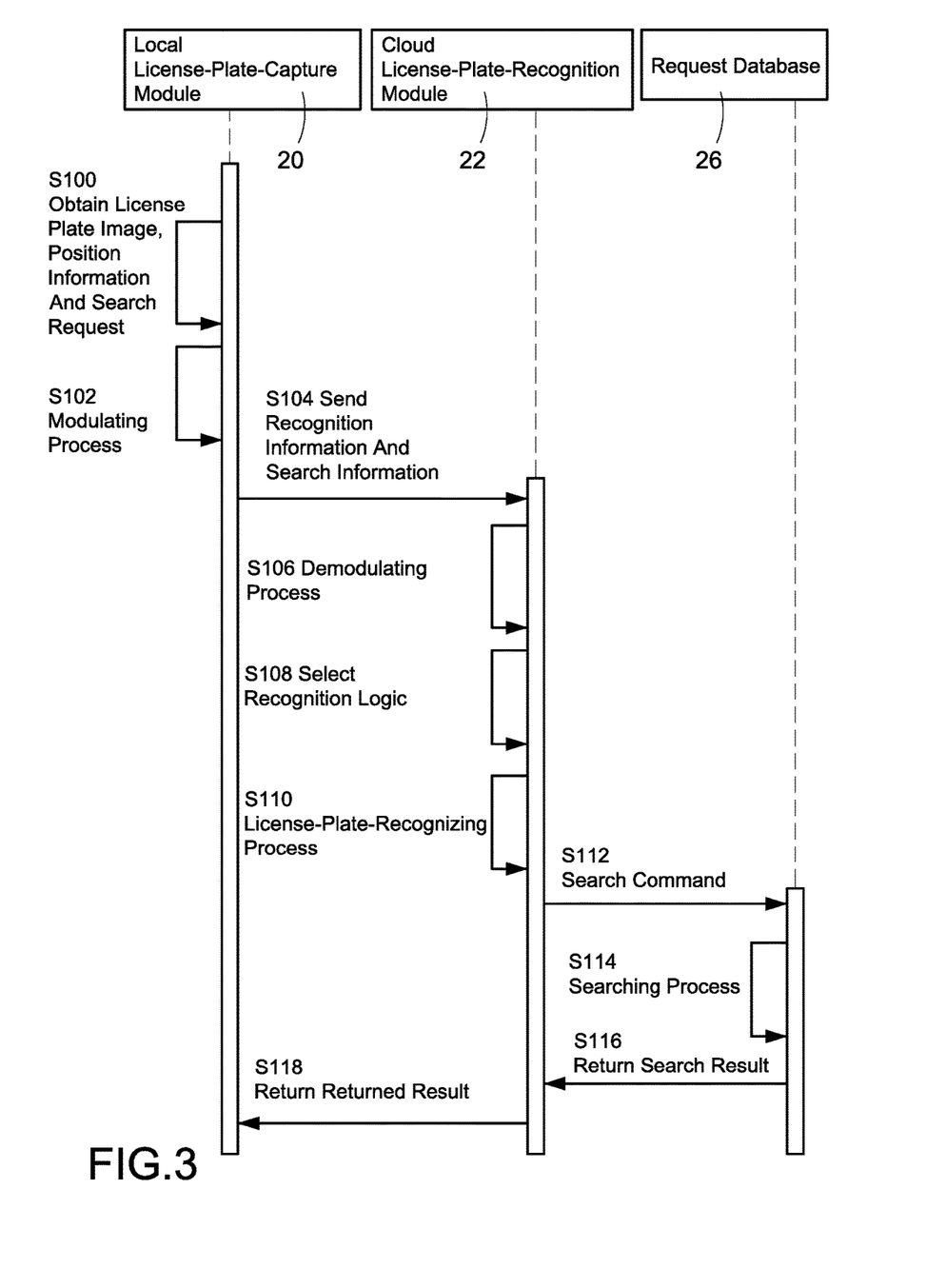
FIG. 3 is a sequence diagram of a cloud-based transregional license-plate-recognition method of an embodiment according to the present disclosed example.

Refer to FIG. 2 and FIG. 3, FIG. 2 is an architecture diagram of a cloud-based transregional license-plate-recognition system of another embodiment according to the present disclosed example, and FIG. 3 is a sequence diagram of a cloud-based transregional license-plate-recognition system of an embodiment according to the present disclosed example. The cloud-based transregional license-plate-recognition system 2, the local license-plate-capture module 20, the local control module 200, the vehicle sensor 202, the image capture module 204, the global positioning module 206, the local transmission module 208, the cloud license-plate-recognition module 22, the Internet 24 shown in FIG. 2 are identical with and similar to the cloud-based transregional license-plate-recognition system 1, the local license-plate-capture module 10, the local control module 100, the vehicle sensor 102, the image capture module 104, the global positioning module 106, the local transmission module 108, the cloud license-plate-recognition module 12 and the Internet 14 shown in FIG. 1 and detailed descriptions are omitted herein. The differences between embodiments shown in FIG. 1 and FIG. 2 are detailed in the following.

As shown in FIG. 2, the local license-plate-capture module 20 further comprises a request module 210 connected to the local control module 200 in the embodiment. The request module 210 receives the search operation from a user via a human machine interface (not shown in the figure) to generate a corresponded search request. The local control module 200 executes a modulating process on the search request to modulate the search request into search information and sends the search information to the cloud license-plate-recognition module 22 via the local transmission module 208.

The cloud license-plate-recognition module 22 comprises a logic selection module 220, multiple local logic modules 222, a license-plate-recognition module 224, a cloud transmission module 226, and a response module 228.

Each local logic module 222 respectively corresponds to different geographic regions and respectively saves the recognition logics of the license plate formats in the corresponded geographic regions. The logic selection module 220 connects with all the local logic modules 222 and the license-plate-recognition module 224. The license-plate-recognition module 224 connects to the cloud transmission module 226. The cloud transmission module 226 communicates with the local license-plate-capture module 20 via the Internet 24. The response module 228 connects to the license-plate-recognition module 224 and connects to multiple external request databases 26.

The present disclosed example also discloses a cloud-based transregional license-plate-recognition method which utilizes the cloud-based transregional license-plate-recognition system 2 shown in FIG. 2. As shown in FIG. 3, the cloud-based transregional license-plate-recognition method comprises the following steps.

The local control module 200 of the local license-plate-capture module 20 obtains the current position information via global positioning module 206, receives search request via request module 210, and controls the image capture module 204 to capture a license plate image when the vehicle sensor 202 detects that a vehicle approaches (Step S100)

The local control module 200 executes a modulating process on the obtained position information and the license plate image to generate recognition information, and executes a modulating process on the search request to generate search information (Step S102).

The local control module 200 sends the recognition information and the search information to the cloud license-plate-recognition module 22 via the local transmission module 208 (Step 104).

Next, the cloud license-plate-recognition module 22 executes a demodulating process on the received data. (Step S106). Specifically, the license-plate-recognition module 224 receives the recognition information and the search information via cloud transmission module 226, and demodulates the recognition information into the recognition image and the index information. Also, the license-plate-recognition module 224 transfers the search information to the response module 228 in order to demodulate the search information into the search conditions via the response module 228.

The logic selection module 220 recognizes the geographic region corresponding to the index information and selects at least one of the multiple local logic modules 222 according to the recognized geographic region and loads the recognition logic from the selected local logic module 222 (Step S108).

The license-plate-recognition module executes the license-plate-recognizing process on the recognition image via the loaded recognition logic to generate the license plate information (Step S110).

The response module 228 selects at least one of the multiple request databases 26 according to the search conditions, generates at least one search command according to the license plate information and the search conditions, and sends the generated search command to the corresponded selected request database 26 (Step S112).

The request database 26 executes a searching process according to the received search command in order to obtain the corresponded search result (Step S114), and returns a search result to the cloud license-plate-recognition module 22 (Step S116).

Lastly, the cloud license-plate-recognition module 22 generates a returned result according to the received search result and returns the returned result to the local license-plate-capture module 20 via the cloud transmission module 226 (Step S118).

Thus, instead of search manually, the present disclosed example automatically search the information associated with the license plate upon recognizing the license plate effectively.

In an embodiment, each request database 26 is a vehicle record database, a policy, regulations and criminal cases database, an environmental regulation database, and other type of databases for saving personal data.

When the request database 26 is a vehicle record database, the request database 26 comprises a plurality of vehicle owner information (including the identification codes such as personal identification numbers or social security numbers), a plurality of vehicle identification codes (such as vehicle numbers or engine numbers), a plurality of vehicle model identification code (such as vehicle color or model numbers) and a plurality of vehicle manufacture dates or other vehicle records respectively corresponding to a plurality of different license plate information. Furthermore, all the vehicle record data (under the same or different types) are associated based on the license plate information. In other words, when a user inputs any license plate information, the user may search all the vehicle record data associated with the license plate information.

When the request database 26 is a database refers to policies, regulations and criminal cases, the request database 26 comprises at least one entry of lost license plate information, at least one entry of criminal cases license plate information, at least one entry of wanted vehicle owner information, or other criminal case related data. Furthermore, all the criminal case related data (under the same or different types) are associated based on the license plate information or the vehicle owner information. In other words, when a user inputs any license plate information or vehicle owner information, the user inquires all the criminal case related data associated with the license plate information or the vehicle owner information.

When the request database 26 is an environmental regulation database, the request database 26 comprises multiple entries of vehicle service life information or multiple entries of vehicle inspection time information or other vehicle status data respectively corresponding to a plurality of different license plate information. Furthermore, all the vehicle status data (under the same or different types) are associated based on the license plate information or the vehicle owner information. In other words, when a user inputs any license plate information or vehicle owner information, the user inquires the vehicle status data associated with the license plate information or the vehicle owner information.

For example, if the received search condition in Step S100 shown in FIG. 3 is "search the service life information of the vehicle", then the cloud license-plate-recognition module 22 generates the search command of the service life information and sends the license plate information and the service life information search command to the environmental regulation database in steps S112-S116. Next, the environmental database searches the service life information of the vehicle associated with the received license plate information and returns the service life information of the vehicle to the cloud license-plate-recognition module 22.

In another example, if all vehicle status information are associated only based on the vehicle owner information in the environmental regulation database, the cloud license-plate-recognition module 22 sends the license plate information to the vehicle record database to search the vehicle owner information associated with the license plate information. Next, the cloud license-plate-recognition module 22 sends the searched vehicle owner information and the search command of the vehicle service life information to the environmental regulation database to search the vehicle service life information associated with the vehicle owner information.

Thus, via searching among a plurality of request databases 26, the present disclosed example can first retrieve the associated information by searching in one request database 26, and search in another request database 26 according to the retrieved associated information automatically when the request databases 26 are not associated with the license plate information, so as to omit the search operations inputted by user manually and to prevent the search from error.

In an embodiment, when the license-plate-recognition module 224 fails to recognize in Step S110 (i.e. the loaded recognition logic fails to recognize the received recognition image), the logic selection module 220 recognizes another geographic region (the second geographic region) geographically near the geographic region (the first geographic region) corresponding to the index information, and loads another recognition logic (the second recognition logic) from another local logic module 222 corresponding to the second geographic region. Next, the license-plate-recognition module 224 uses the loaded second recognition logic to re-execute license-plate-recognizing process on the recognition image. In addition, when the license-plate-recognition module 224 fails to recognize again, the license-plate-recognition module 220 then recognizes another geographic region (the third geographic region) geographically near the second geographic region, and so on.

It should be noted that when the license-plate-recognition system of the related art captures the license plate image of a vehicle from another geographic region, the license plate recognition will fail because the currently applied recognition logic fails to recognize the license plate format of another geographic region.

Via automatically loading the recognition logic of another geographic region to re-execute license-plate-recognizing process, the present disclosed example can effectively increases the recognition success rate. Besides, vehicles travel regionally (i.e. vehicles generally travel among neighboring geographic regions). Accordingly, the present disclosed example executes license-plate-recognizing process with the recognition logics in geographically neighboring regions, which effectively increases the success rate of re-executing the license-plate-recognizing process, lowers the recognition time by reducing the re-recognition rate.

Figure 4:
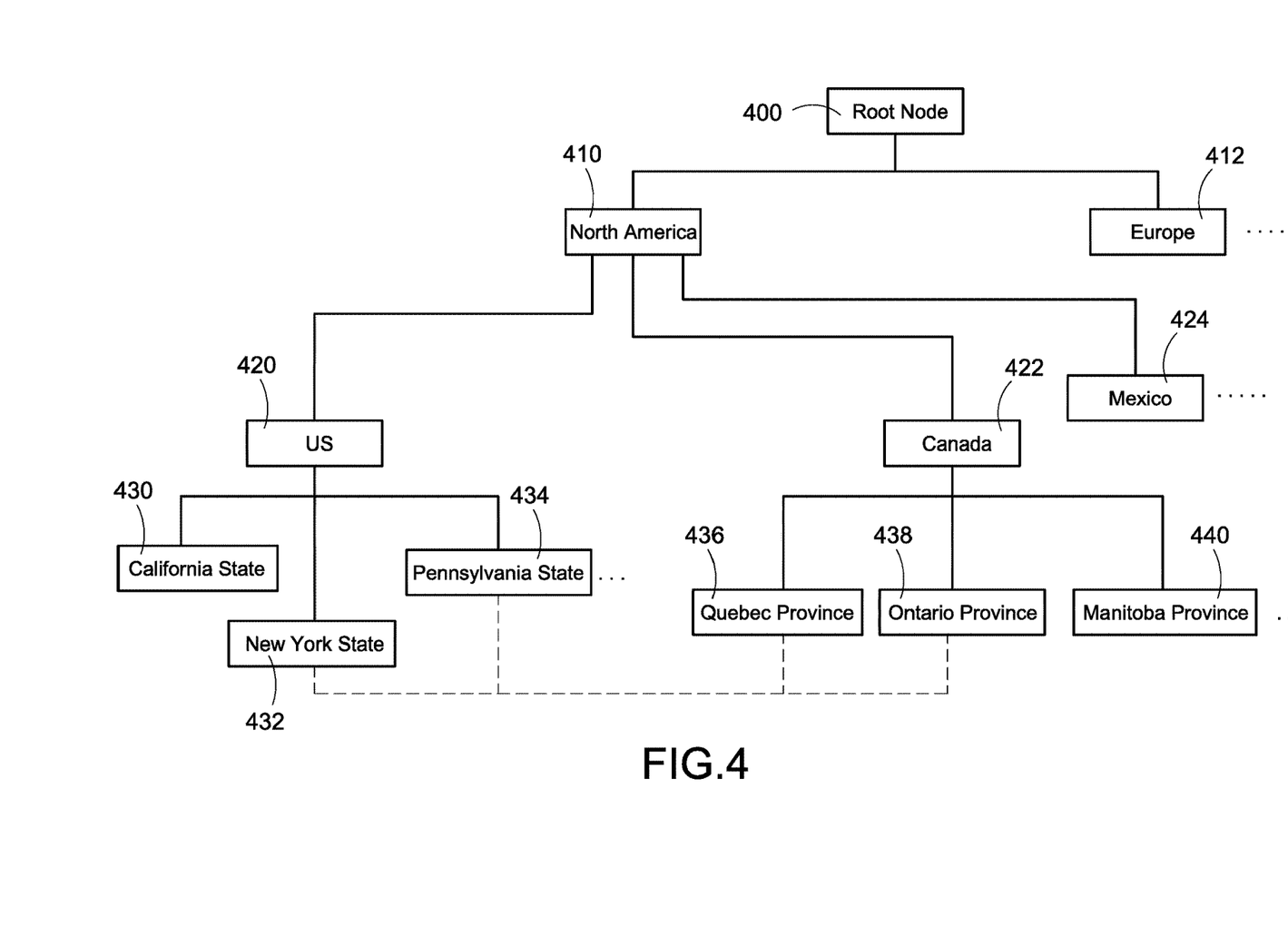
FIG. 4 is a tree diagram of a plurality of recognition logics of an embodiment according to the present disclosed example.

FIG. 4 is a tree diagram of a plurality of recognition logics of an embodiment according to the present disclosed example, which illustrates how the present disclosed example quickly recognizes another geographic region geographically near the current geographic region.

As shown in FIG. 4, the present disclosed example uses the geographic regions corresponding to the plurality of recognition logics as leaf nodes (such as the California state node 430, the New York state node 432, the Pennsylvania state node 434, the Quebec province node 436, the Ontario province node 438 and the Manitoba province node 440 in FIG. 4), and categorizes the leaf nodes according to geographic relations to form the tree diagram as shown in FIG. 4 for quickly recognizing the geographic relations.

Specifically, there is a plurality of continent nodes under a root node 400 (only the northern America continent node 410 and the Europe continent 412 shown in FIG. 4). Based on the countries included in each continent, each continent node is branched into a plurality of country nodes (only the US node 420, the Canada node 422 and the Mexico node 424 are shown in FIG. 4). Based on the administrative regions included in each country, each country node is branched into a plurality of administrative region nodes (only the California state node 430, the New York state node 432, and the Pennsylvania state node 434 under the US node 420; and the Quebec province node 436, the Ontario province node 438 and the Manitoba province node 440 under the Canada node 422 are shown in FIG. 4).

The present disclosed example configures a geographic near link between two leaf nodes (indicated as dotted line in FIG. 4) when several leaf nodes geographically near each other (such as two geographic regions geographically neighboring each other). Thus, when license-plate-recognition module 224 fails to recognize, the present disclosed example quickly recognize another geographic region geographically near the geographic region corresponding to the present loaded recognition logic via above-mentioned geographic near link, and quickly loads the recognition logic of the geographic region.

For example, the New York state, the Pennsylvania state, the Quebec province and the Ontario province are geographically neighboring each other, so the geographic near link are set up among the New York state node 432, the Pennsylvania state node 434, the Quebec province node 436, and the Ontario province node 438. When the cloud license-plate-recognition module 22 loads the recognition logic of the New York state node 432 and fails to recognize, the cloud license-plate-recognition module 22 selects and loads the recognition logics of the Pennsylvania state node 434, the Quebec province node 436, and the Ontario province node 438 based on above-mentioned geographic near links in order to re-execute the license-plate-recognizing process.

Figure 6A:
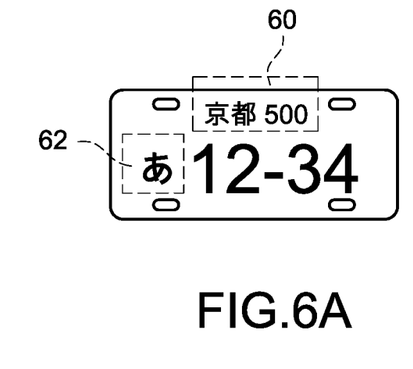
FIG. 6A is a first schematic diagram of a Japan license plate according to the present disclosed example.
Figure 6B:
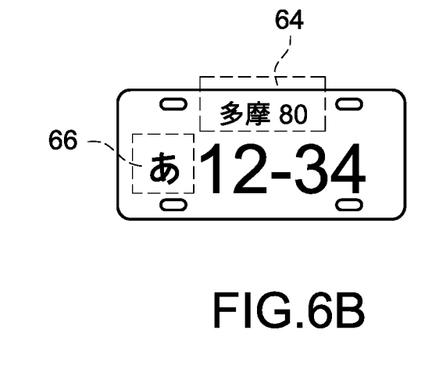
FIG. 6B is a second schematic diagram of a Japan license plate according to the present disclosed example.
Figure 7A:
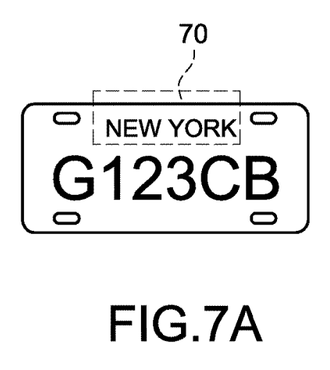
FIG. 7A is a first schematic diagram of a US license plate according to the present disclosed example.
Figure 7B:
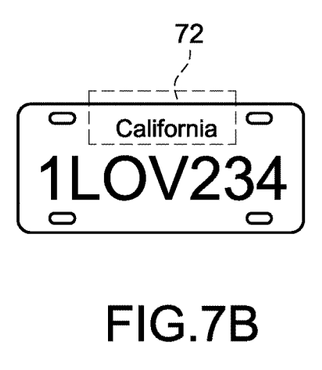
FIG. 7B is a second schematic diagram of a US license plate according to the present disclosed example.
Figure 8A:
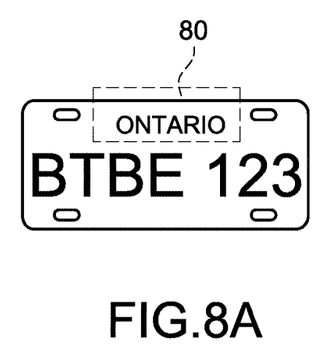
FIG. 8A is a first schematic diagram of a Canada license plate according to the present disclosed example.
Figure 8B:
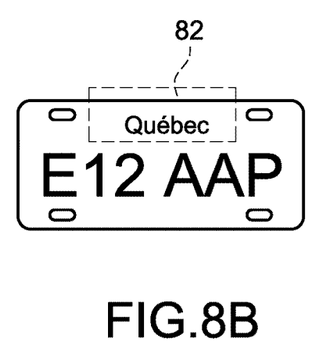
FIG. 8B is a second schematic diagram of a Canada license plate according to the present disclosed example.

Refer to FIG. 5A to FIG. 8B, FIG. 5A is a first schematic diagram of a Taiwan license plate according to the present disclosed example; FIG. 5B is a second schematic diagram of a Taiwan license plate according to the present disclosed example; FIG. 5C is a third schematic diagram of a Taiwan license plate according to the present disclosed example; FIG. 6A is a first schematic diagram of a Japan license plate according to the present disclosed example; FIG. 6B is a second schematic diagram of a Japan license plate according to the present disclosed example; FIG. 7A is a first schematic diagram of a US license plate according to the present disclosed example; FIG. 7B is a second schematic diagram of a US license plate according to the present disclosed example; FIG. 8A is a first schematic diagram of a Canada license plate according to the present disclosed example; and FIG. 8B is a second schematic diagram of a Canada license plate according to the present disclosed example. FIG. 5A to FIG. 8B illustrates how to use different recognition logics to recognize license plates of different geographic regions (each country is regarded as a geographic region in the embodiment) according an embodiment of the present disclosed example.

In the embodiment, the recognition logic of each geographic region is distinguished by different types of recognized characters.

Figure 5A:
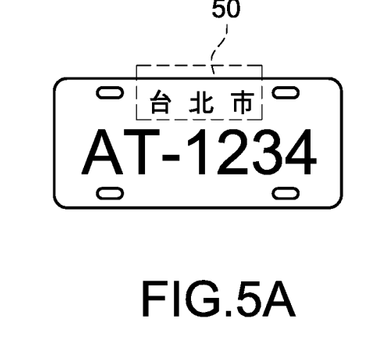
FIG. 5A is a first schematic diagram of a Taiwan license plate according to the present disclosed example.
Figure 5B:
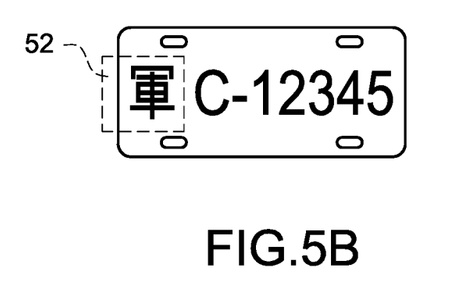
FIG. 5B is a second schematic diagram of a Taiwan license plate according to the present disclosed example.
Figure 5C:
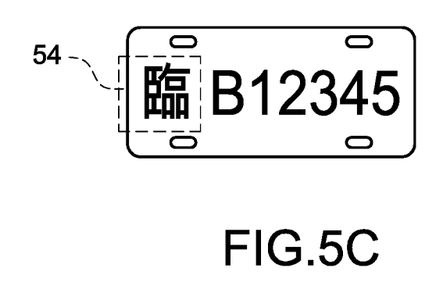
FIG. 5C is a third schematic diagram of a Taiwan license plate according to the present disclosed example.

In the embodiment from FIG. 5A-5C, the recognition logic corresponding to Taiwan recognizes Chinese characters, English characters and numerical characters. When the cloud license-plate-recognition module 22 loads recognition logic corresponding to Taiwan, the cloud license-plate-recognition module 22 correctly recognizes the Chinese character set 50 indicating the place of issue in the license plate image shown in FIG. 5A, correctly recognizes the Chinese characters 52 indicating the vehicle type in the license plate image shown in FIG. 5B, correctly recognizes the Chinese characters 54 indicating the vehicle type in the license plate image shown in FIG. 5C in addition to recognizing English characters and numerical characters.

In the embodiment from FIG. 6A-6B, the recognition logic corresponding to Japan recognizes Kanji characters, Kana characters and numerical characters. When the cloud license-plate-recognition module 22 loads recognition logic corresponding to Japan, the cloud license-plate-recognition module 22 correctly recognizes the Kanji character set 60 indicating the place of issue and the Kana characters 62 indicating vehicle purpose or license plate issue order in the license plate image shown in FIG. 6A, and correctly recognizes the Kanji character set 64 indicating a different place of issue and the Kana characters 66 indicating vehicle purpose or license plate issue order in the license plate image shown in FIG. 6B in addition to recognizing numerical characters.

In the embodiment from FIG. 7A-7B, the recognition logic corresponding to US recognizes English characters and numerical characters. When the cloud license-plate-recognition module 22 loads recognition logic corresponding to US, the cloud license-plate-recognition module 22 correctly recognizes the license plate number and the English character set 70 indicating the place of issue in the license plate image shown in FIG. 7A, and correctly recognizes the license plate numbers and the English character set 72 indicating a different place of issue in the license plate image shown in FIG. 7B.

According to the embodiments shown in FIG. 8A and FIG. 8B, the recognition logic corresponding to Canada recognizes French characters, English characters, and numerical characters. When cloud license-plate-recognition module 22 loads Canada recognition logic, the cloud license-plate-recognition module 22 correctly recognizes the French character set 82 indicating the place of issue in the license plate image shown in FIG. 8B in addition to correctly recognizing the English characters, and the numerical characters (such as recognizing the English characters 80 indicating the place of issue shown in FIG. 8A).

Accordingly, the present disclosed example effectively accomplishes transregional license plate recognition by loading recognition logics of different geographic regions.

As the skilled person will appreciate, various changes and modifications can be made to the described embodiment. It is intended to include all such variations, modifications and equivalents which fall within the scope of the present disclosed example, as defined in the accompanying claims.

What is claimed is:

1. A cloud-based transregional license-plate-recognition system, comprising:
   a local license-plate-capture module, comprising:
   a vehicle sensor for detecting whether a vehicle is approaching;
   an image capture module electrically connected to the vehicle sensor for capturing a license plate image when the vehicle is approaching;
   a global positioning module for obtaining position information;
   a local control module electrically connected to the image capture module and the global positioning module for modulating the license plate image and the position information into recognition information; and
   a local transmission module electrically connected to the local control module for sending the recognition information externally via Internet; and
   a cloud license-plate-recognition module for receiving the recognition information from Internet, demodulating the recognition information to generate a recognition image and an index information, selecting at least one of a plurality of recognition logics based on the index information, and executing an Optical Character Recognition (OCR) process on the recognition image via using the selected recognition logic to generate a license plate information,
   wherein the cloud license-plate-recognition module comprising:
   a plurality of local logic modules respectively corresponding to a plurality of geographic regions for saving the plurality of recognition logics;
   a logic selection module connecting to the plurality of local logic modules for recognizing the geographic regions corresponding to the index information, and loading the recognition logic from the local logic module corresponding to the geographic region; and a license-plate-recognition module connecting to the logic selection module for executing the OCR process on the recognition image via the loaded recognition logic to generate the license plate information, wherein the logic selection module recognizes another geographic region geographically near the geographic region corresponding to the index information when the license-plate-recognition module fails in recognition, and loads another recognition logic from another local logic module corresponding to another geographic region, the license-plate-recognition module re-executes the OCR process on the recognition image via the loaded another recognition logic to generate the license plate information, and wherein each of the local license-plate-capture module, the image capture module, the global positioning module, the local control module, the local transmission module, the cloud license-plate-recognition module, the local logic module, the logic selection module and the license-plate-recognition module is performed by a processor.

2. The cloud-based transregional license-plate-recognition system of claim 1, wherein the cloud license-plate-recognition module comprises a cloud transmission module connecting to the license-plate-recognition module and returning the license plate information to the local transmission module via Internet.

3. The cloud-based transregional license-plate-recognition system of claim 1, wherein the plurality of recognition logics are respectively configured to recognizing a plurality of different character sets, a plurality of character sequences or a plurality of quantities of characters.

4. The cloud-based transregional license-plate-recognition system of claim 1, wherein the plurality of recognition logics are respectively configured to recognizing a plurality of local license plate rules, a plurality of character block arrays or a plurality of license plate color arrays.

5. The cloud-based transregional license-plate-recognition system of claim 1, wherein the local license-plate-capture module further comprises a request module connecting to the local control module for receiving a search request, the local control module modulates the search request into a search information, and transfers the search information to the cloud license-plate-recognition module via the local transmission module.

6. The cloud-based transregional license-plate-recognition system of claim 5, wherein the cloud license-plate-recognition module comprises a response module connecting to a plurality of request databases, the response module demodulates the search information to generate a search condition, and selects at least one of the plurality of request databases according to the search condition and searching in the selected request database for obtaining a search result according to the license plate information, the cloud license-plate-recognition module generates a returned result to return to the local license-plate-capture module.

7. The cloud-based transregional license-plate-recognition system of claim 6, wherein the plurality of request databases comprise a vehicle record database, a database refers to policies, regulations and criminal cases, and an environmental regulation database.

8. The cloud-based transregional license-plate-recognition system of claim 7, wherein the vehicle record database comprises a plurality of vehicle owner identification codes, a plurality of vehicle model identification code and a plurality of vehicle manufacture dates respectively corresponding to a plurality of different license plate information.

9. The cloud-based transregional license-plate-recognition system of claim 7, wherein the database refers to policies, regulations and criminal cases comprises lost license plate information, criminal cases license plate information or wanted vehicle owner information.

10. The cloud-based transregional license-plate-recognition system of claim 7, wherein the environmental regulation database comprises vehicle service life information or vehicle inspection time information.

11. A cloud-based transregional license-plate-recognition method, for a cloud-based transregional license-plate-recognition system, the cloud-based transregional license-plate-recognition system including a local license-plate-capture module and a cloud license-plate-recognition module, the cloud-based transregional license-plate-recognition method comprising:

a) capturing a license plate image when the local license-plate-capture module detects that a vehicle is approaching;

b) obtaining position information;

c) modulating the license plate image and the position information into recognition information and sending the recognition information to the cloud license-plate-recognition module;

d) demodulating the recognition information by the cloud license-plate-recognition module to generate a recognition image and index information; and e) selecting at least one of a plurality of recognition logics based on the index information, and executing an Optical Character Recognition (OCR) process on the recognition image via using the selected recognition logic to generate license plate information, wherein the recognition logics are respectively corresponded to a plurality of geographic regions, the step e) comprises:

e1) recognizing at least one of the geographic regions corresponding to the index information;

e2) loading the recognition logic corresponding to the recognized geographic region; and e3) executing the OCR process on the recognition image via the loaded recognition logic to generate the license plate information; and f1) recognizing another geographic region geographically near the geographic region corresponding to the index information upon the cloud license-plate-recognition module failing to recognize;

f2) loading another recognition logic corresponding to the another geographic region; and f3) re-executing the OCR process on the recognition image via the loaded another recognition logic to generate the license plate information, wherein each of the local license-plate-capture module and the cloud license-plate-recognition module is performed by a processor.

12. The cloud-based transregional license-plate-recognition method according to claim 11, wherein the plurality of recognition logics are respectively configured to recognize a plurality of different character sets, a plurality of character sequences or a plurality of quantities of characters.

13. The cloud-based transregional license-plate-recognition method according to claim 11, wherein the plurality of recognition logics are respectively configured to recognize a plurality of local license plate rules of the plurality of geographic regions, a plurality of character block arrays or a plurality of license plate color arrays.

14. The cloud-based transregional license-plate-recognition method according to claim 11, comprising the following steps before the step d):
   g1) receiving a search request by the local license-plate-capture module; and
   g2) modulating the search request into search information, and transferring the search information to the cloud license-plate-recognition module.

15. The cloud-based transregional license-plate-recognition method according to claim 14, comprising the following steps before the step g2):
   h1) demodulating the search information by the cloud license-plate-recognition module to generate a search condition, and
   h2) selecting at least one of a plurality of request databases according to the search condition, wherein the plurality of request databases comprise a vehicle record database, a database refers to policies, regulations and criminal cases, and an environmental regulation database.

16. The cloud-based transregional license-plate-recognition method according to claim 15, comprising the following steps after the step e) and the step h2):
   i1) searching in the selected request database for obtaining a search result according to the license plate information; and
   i2) generating a returned result according to the search result to return to the local license-plate-capture module.

* * * * *